(12) United States Patent
Eggert et al.

(10) Patent No.: US 7,114,409 B2
(45) Date of Patent: Oct. 3, 2006

(54) SHORT CHANGE GEAR

(75) Inventors: Ulrich Eggert, Viersen (DE); Andreas Hegerath, Bergheim (DE)

(73) Assignee: Getrag Ford Transmissions GmbH, Cologne (DE)

( * ) Notice: Subject to any disclaimer, the term of this patent is extended or adjusted under 35 U.S.C. 154(b) by 5 days.

(21) Appl. No.: 10/790,928

(22) Filed: Mar. 2, 2004

(65) Prior Publication Data

US 2005/0193846 A1   Sep. 8, 2005

(30) Foreign Application Priority Data

Mar. 7, 2003   (EP) .................................. 03100580

(51) Int. Cl.
  *F16H 3/08* (2006.01)
(52) U.S. Cl. .............................. 74/331; 74/339; 74/340
(58) Field of Classification Search .................. 74/331, 74/339, 340
  See application file for complete search history.

(56) References Cited

U.S. PATENT DOCUMENTS

| | | | |
|---|---|---|---|
| 3,897,699 A * | 8/1975 | Hoyer | ......................... 74/745 |
| 5,819,587 A | 10/1998 | Leber et al. | |
| 6,845,682 B1 * | 1/2005 | Bulgrien | ....................... 74/331 |
| 6,874,381 B1 * | 4/2005 | Berger et al. | .................. 74/335 |
| 2002/0092372 A1 | 7/2002 | Bowen | |

FOREIGN PATENT DOCUMENTS

| | | |
|---|---|---|
| EP | 0 207 910 A1 | 1/1987 |
| EP | 1 067 312 A1 | 1/2001 |
| EP | 1124079 A2 * | 8/2001 |
| EP | 1130291 A1 * | 9/2001 |
| JP | 03-048060 | 2/2003 |

* cited by examiner

*Primary Examiner*—Saul Rodriguez
*Assistant Examiner*—David D. Le
(74) *Attorney, Agent, or Firm*—Alexander R. Schlee

(57) ABSTRACT

The invention provides a change gear, in particular in motor vehicles. This transmission comprises input and output shafts, a drive shaft that is in torque transmitting connection with the first and second output shafts; a first group of gear sets comprising at least one first gear set; a second group of gear sets comprising at least one second gear set; an itermediate shaft; and a first gear section. The input shaft is connectable with the first output shaft by the first group of gear sets. A second gear section is provided in which the intermediate shaft is connectable to the second output shaft by the second group of gear sets. The intermediate shaft is in gearing connection with the first input shaft.

17 Claims, 3 Drawing Sheets

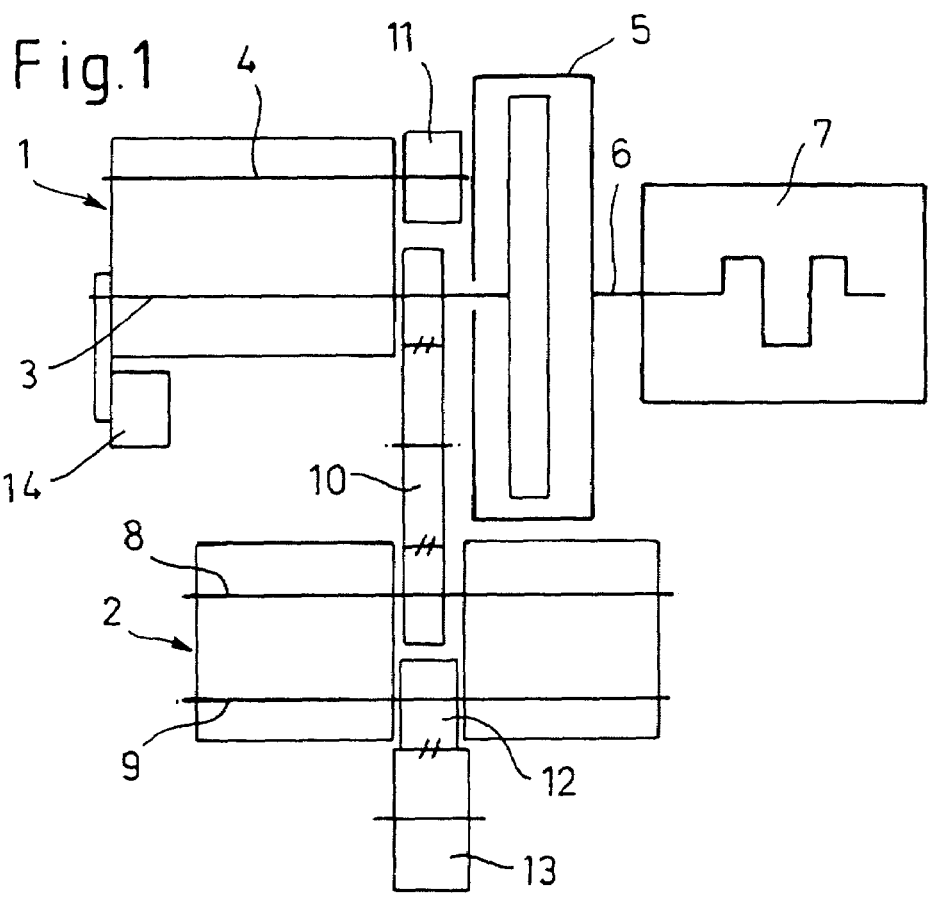
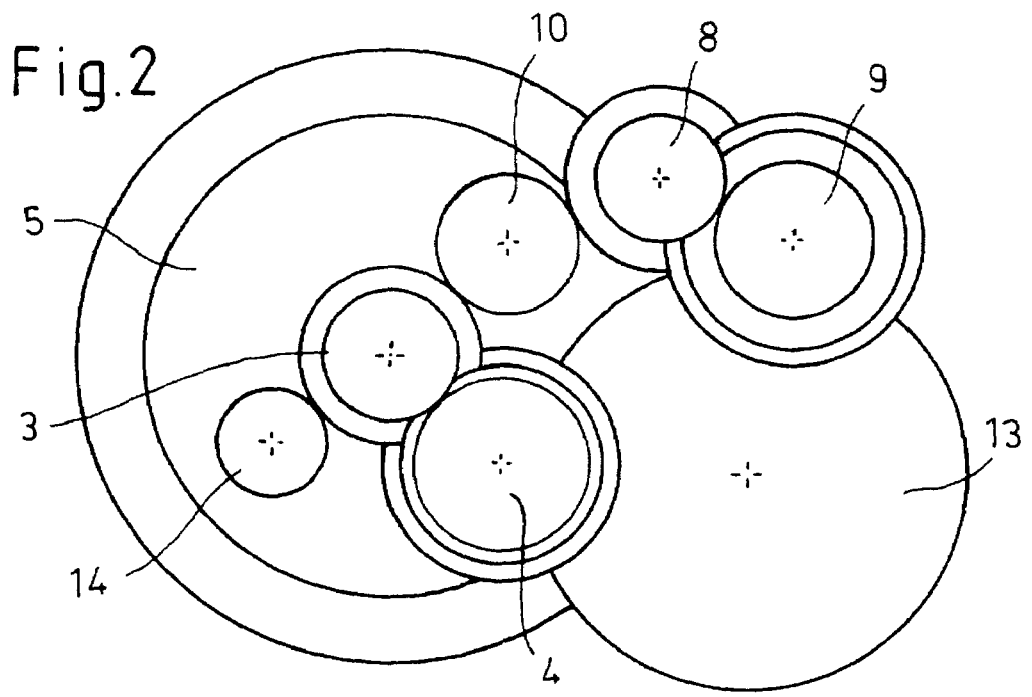

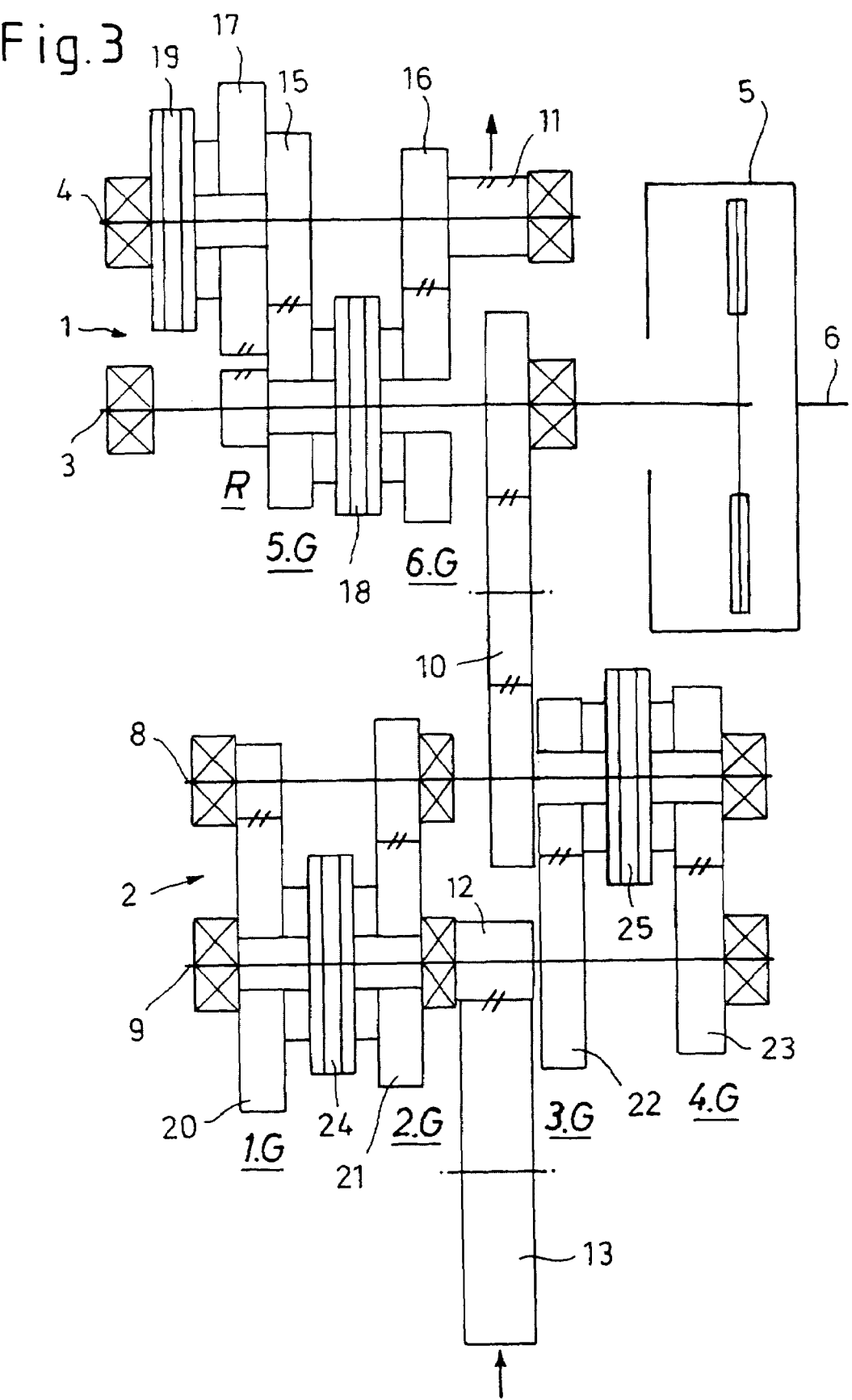

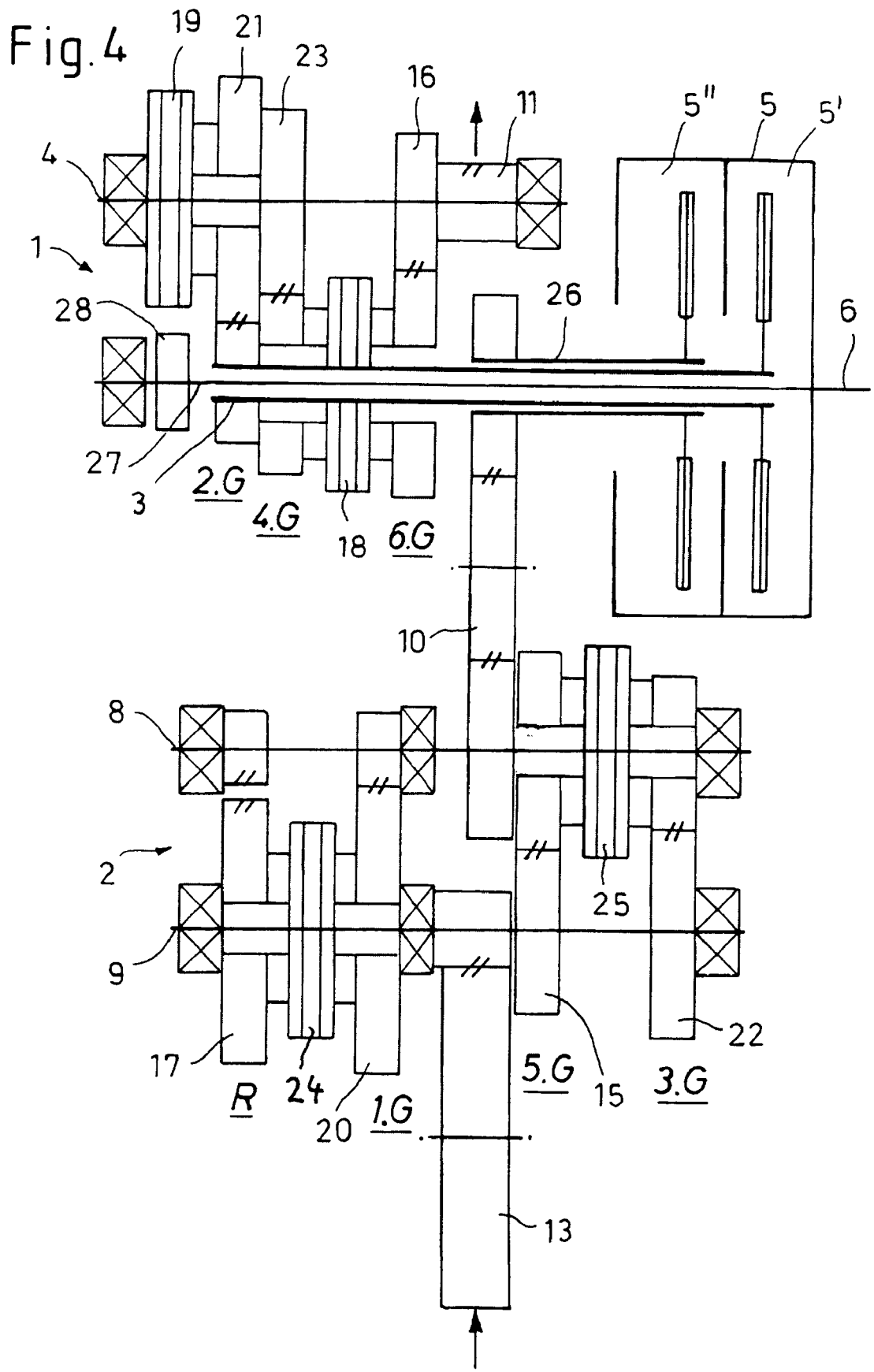

SHORT CHANGE GEAR

Priority from the European Patent Application 03100580.4 is claimed the content of which is herewith incorporated entirely by reference.

FIELD OF THE INVENTION

The present invention relates generally to transmissions for use in motor vehicles and, more particularly, to a short change gears.

BACKROUND OF THE INVENTION

A transmission is known from the European Patent EP 1 067 312. This kind of transmission can be configured as manual or automatic change gear or also as a power shift gear. In all of these variations the 2 output shafts are in torque transmitting connection with the drive shaft. In the manual and the automatic gear change version the transmission is provided with an input shaft that is connected by means of several gear sets with the first and with the second output shaft. Each gear set is provided with a fixed gear and a shiftable loose gear. Even though all gear shift mechanisms for shifting the loose wheels are located on the output shafts the interleaved positions of the fixed gears on the input shaft results in a certain overall length of the transmission that is longer than the space needed just for the loose wheels with the gear shift mechanisms. This applies also for the power shift gear version comprising 2 input shafts positioned coaxially to each other and that are likewise interconnected with the output shafts by means of several gear sets.

In the U.S. Pat. No. 6,427,550 a twin-clutch transmission is described comprising one input shaft and one intermediate shaft, said intermediate shaft being connected by means of a chain drive with a transfer shaft coaxially disposed in relation to the input shaft. Input shaft and intermediate shaft are connected by means of several wheel sets with the output shaft. Even though this avoids the problem of interleaved positioning of the various gear sets since the loose wheels on the intermediate shaft and on the input shaft mesh with the same fixed wheels on the output shaft it is a known problem in the prior art that such multiple interdependence between the gear sets renders it difficult to provide the optimum gear speeds in the various gears in relation to each other.

SUMMARY OF THE INVENTION

Accordingly, it is an object of the invention to provide a change gear with a very short overall length in lengthwise direction.

It is a further object of the present invention to use the same basic transmission design for different variations such as manual gear shift transmissions, automatic gear shift transmissions, and power gear shift transmissions.

These and other object of the present invention are achieved by a short change gear, in particular for motor vehicles, comprising: at least a first input shaft; a first output shaft; a second output shaft; a drive shaft that is in torque transmitting connection with the first and second output shafts; a first group of gear sets comprising at least one first gear set; a second group of gear sets comprising at least one second gear set; an intermediate shaft; a first gear section in which the input shaft is connectable with the first output shaft by means of the first group of gear sets; a second gear section in which the intermediate shaft is connectable to the second output shaft by means of the second group of gear sets; wherein the intermediate shaft is in gearing connection with the first input shaft.

According to this configuration the 2 gear sections are in fact independent transmissions, both of which can be configured as short as possible. Neither an interleaved configuration due to adjacent output shafts, nor mutual interdependence of the gear wheels due to meshing of several loose wheels with the same fixed wheel has to be accepted. The intermediate gear implements a large radial offset between the gear sections in relation to the shafts and does therefore make the second gear section independent from the first.

At the same time, the input shaft can be connected to the first output shaft and the intermediate shaft can be connected to the second output shaft by at least 1 gear set, respectively. For a motor vehicle gear box several gear sets are required depending on how many gears in total the gear box has. Since both gear sections are independent from each other, it is immaterial which gear sets for which gears are provided on which shafts. Any imaginable combination of gear sets can be implemented in the respective gear sections.

The gearing connection between the intermediate shaft and the input shaft can be achieved by any suitable transmission means that allows transmitting both the rotational movement and the torque between the shafts. Particularly, gear wheels on both shafts with an intermediate gear wheel or a chain drive are suitable. For clarity reasons it is referred to the intermediate gear variation in the following but this should be understood as covering also any other suitable transmission means.

An especially space-saving configuration can be achieved if drive pinions on each of the output shafts connecting these output shafts with the respective drive shafts are positioned in the same plane as the intermediate gears. Accordingly, the axial space that has to be provided for the drive pinions in any case can be used at the same time for the intermediate shaft so that no additional axial space is needed for the additional intermediate shaft.

According to another preferred embodiment the second gear section is provided with gear sets being positioned in front of a gear meshing with the intermediate shaft and gear sets are provided behind said meshing gear if viewed in direction of the intermediate shaft. Because of the axial offset of the intermediate shaft in relation to the input shaft the intermediate shaft is also allowed to extend in axial direction towards a clutch and therefore also the space on the level of the clutch is used in a space saving manner.

Preferably, the number of gear sets in the second gear section is at least as high as the number of gear sets in the first gear section. Since due to the measures described in the preceding paragraph the axial space available for the intermediate shaft is bigger than for the input shaft it is advantageous to provide at least the same number of gear sets or better even a higher number of gear sets in the second gear section rather than in the first gear section. The maximum axial length of the entire gear box is determined significantly by the length of the input shaft and therefore by the number of gear sets in the first gear section.

According to a preferred embodiment of the invention the motor shaft can be connected with the input shaft by means of a clutch and the input shaft can be connected with the first output shaft and is connected by means of the intermediate gear with the intermediate shaft. This configuration refers to a manual or an automatic transmission. Such transmissions comprise only one input shaft that is connectable by means of a clutch with the motor shaft of a motor, preferably of a combustion engine. The input shaft is connectable to the first output shaft by means of gear sets provided thereon and suitable shifting mechanisms, for example, synchronizing clutches on the loose wheels of the gear sets. The input shaft is permanently connected to the intermediate shaft by means of the intermediate gear while the intermediate shaft is connectable to the second output shaft by means of gear sets. By splitting the entire gear box into 2 gear sections it is possible to configure the entire gear box with a very short overall length and at the same time be free to choose the gear transmission ratios of all gear sets freely as desired. This achieves a very good adjustment to any required gear transmission ratio characteristics.

Advantageously, gear sets are positioned in an adjacent manner both in the first and the second gear section so that the loose wheels can be shifted by means of a mutual synchronizing mechanism, said gear sets relating to consecutive forward gears, respectively. Such a configuration is used in particular in a manual change gear, for instance if a mutual synchronizing mechanism is provided for shifting both the first and the second gear. This applies also to the combination of the $3^{rd}$ and $4^{th}$ gear as well as the $5^{th}$ and $6^{th}$ gear. This configuration can be combined without significant mechanical complexity with the manual operating mechanism for shifting in which the first and $2^{nd}$ gear, $3^{rd}$ and $4^{th}$ gear, and so on are provided within one shifting path.

A particularly advantageous split-up can be achieved in a 6-gear shift transmission if the gear sets for the $5^{th}$ and $6^{th}$ gear are provided in the first gear section and the gear sets for the $1^{st}$ to the $4^{th}$ gear are provided in the second gear section. The first gear section can have a very short length since only the $5^{th}$ and $6^{th}$ gear maybe provided therein, possibly supplemented by the reverse gear. In this connection it does not matter whether the shifting and synchronizing mechanisms for the loose wheels are provided on the input shaft or on the first output shaft. This can be chosen as desired to be in line with the requirements for the space needed, the noise development, the shifting characteristics and the moment of inertia of the arrangement.

This applies also for the second gear section in which the gear sets for the $1^{st}$ to the $4^{th}$ gear can be combined in any desired manner on the intermediate shaft and the second output shaft. In this connection it is immaterial whether the first and the second gear or the first and the $3^{rd}$ gear are shifted by a mutual shifting mechanism or whether the shifting mechanism is provided on the intermediate shaft or the second output shaft or whether the gear sets are in part provided in front or behind the gear wheel that meshes with the intermediate gear wheel.

Preferably, a gear set for the reverse gear is provided in the first gear section in that a fixed wheel and a large wheel are connected to each other by means of an intermediate wheel that is rotatably borne on a shaft. This measure allows positioning the reverse gear as desired and in a space-saving manner.

According to a preferred embodiment the intermediate shaft is positioned at that side of the input shaft that is facing the clutch. This achieves a direct power transmission from the clutch to the input shaft onto the intermediate gear and therefore avoids that the input shaft is subjected over its entire length by the torque to be transmitted to the intermediate shaft. Advantageously, this configuration can be combined with the feature that the drive pinions on the output shafts are provided in one and the same plane as the intermediate gear.

According to a further advantageous embodiment a motor shaft can be connected to the first input shaft by means of a clutch, said first input shaft is connectable to the first output shaft, and the motor shaft can be connected to a second input shaft by means of a second clutch, wherein the second input shaft is coaxially provided in relation to the first input shaft, and this second input shaft is connected to the intermediate shaft by means of an intermediate gear. Such a twin clutch gear is preferred as a power shift gear, the function of which being in principle known from prior art.

In this configuration power can be transmitted into the first gear section only through the first clutch so that an optimized setting both in relation to the control characteristics as well as the gear transmission ratio can be obtained. Likewise, this applies to the second gear section that is a completely independent transmission and connected through the second clutch with the motor shaft.

Favorably, the first gear section does not provide any gear sets for even-numbered forward gears and the second gear section does not provide any odd-numbered forward gears, or vice versa. Such a configuration satisfies the requirements made on a power shift gear in which no consecutive gears should be shifted by one and the same clutch. This configuration ensures that for shifting sequentially up or down alternately one of the gear section is connected by means of a clutch.

It has turned out to be beneficial if the first gear section comprises gear sets for the $2^{nd}$, $4^{th}$ and $6^{th}$ gear while the second section comprises gear sets for the $1^{st}$, $3^{rd}$ and $5^{th}$ gear in case of a 6 gear transmission. In this case, the reverse gear is as well provided in the second gear section providing overall more space in axial direction. If the $1^{st}$ gear and the reverse gear are provided on one shifting mechanism this secures in a simple manner implementation of the safety feature to prevent shifting from one of the forward gears directly into the reverse gear, since for shifting from the $1^{st}$ gear into the reverse gear in any event the same clutch has to be operated.

Providing the reverse gear together with one forward gear on the same shifting mechanism is of course also possible vice versa namely that the reverse gear is provided in the same gear section with the even-numbered forward gears. Such a configuration guarantees that shifting between the $1^{st}$ and the reverse gear is only possible by alternately operating the 2 clutches, which can advantageously be used for moving stuck vehicles out of their stuck condition.

Further, a pump shaft connected to the motor shaft can be provided coaxially within the input shaft designed as a hollow shaft. In case of use for an automatic shift gear or a power shift gear it may be necessary that the gear is provided with its own supply for pressurized oil. By designing the input shaft as a hollow shaft the pump shaft can be provided therein and in rotationally fixed connection to the motor shaft so that by a simple design permanent propulsion of the oil supply in the transmission is guaranteed.

Use of such a gear box can be both for lengthwise and transverse installation in a motor vehicle. Adjustment to the requirements of the motor vehicle can be made by designing the drive shaft accordingly. For instance, an additional differential gear can be integrated into the drive shaft and therefore allow a direct connection to the axle drive shafts.

BRIEF DESCRIPTIONS OF THE DRAWINGS

FIG. 1 is a schematic view of a transmission according to the present invention;

FIG. 2 is a schematic side view of the transmission shown in FIG. 1;

FIG. 3 is a schematic view of a 6-gear shift transmission; and

FIG. 4 is a schematic view of a 6-gear power shift transmission.

The drawings have to be understood as schematic views only and are not drawn to scale. For demonstrating all elements more clearly, some elements are shown folded into a different plane in FIGS. 1, 3 and 4, and some elements are not shown at full scale as for instance the drive shaft gear 13 in FIG. 1.

The schematic view of the transmission according to the present invention shown in FIG. 1 shows in principle the arrangement of a first gear section 1 and a second gear section 2. The first gear section 1 comprises and input shaft 3 and an output shaft 4. By means of a clutch 5 the input shaft 3 can be connected with the motor shaft 6 of a combustion engine 7.

The second gear section 2 comprises an intermediate shaft 8 and an output shaft 9, said intermediate shaft 8 being connected with the input shaft 3 by means of the intermediate gear 10. The first and the second output shafts 4 and 9 are provided with a pinion 11 and 12, respectively, that are in direct connection with the drive shaft 13.

An oil pump 14 is attached to the first gear section and driven by a pump shaft that is not shown. This pump shaft is positioned coaxially in relation to the input shaft 3 and in torque proof connection with the motor shaft 6.

In the schematic view the second gear section 2 is shown as well in front of the plane of the intermediate shaft 10 and behind this plane. It is self-evident that this is no compulsory necessity, in fact the position of the second gear section in relation to the intermediate shaft 10 can be chosen as desired depending on design related, constructional or other functional requirements.

FIG. 2 shows a schematic side view of the transmission according to the present invention. The clutch 5 and the input shaft 3 are disposed on one axle. The input shaft can be connected by means of various gear sets with the output shaft 4 and is in permanent connection with the intermediate shaft 8 by means of the intermediate gear 10.

The intermediate shaft 8 can be connected by means of various gear sets with the second output shaft 9, said second output shaft 9 and the first output shaft 4 permanently meshing with the drive shaft 13. The oil pump 14 is connected through appropriate transmission connecting means directly with the drive train.

A manually shiftable 6-gear transmission is shown in FIG. 3. The first gear section 1 is provided with the gear sets for the $5^{th}$ gear 15 and $6^{th}$ gear 16 and the reverse gear 17. The $5^{th}$ and $6^{th}$ gear are provided with mutual synchronizing mechanisms 18 that are provided on the input shaft 3. By means of the synchronizing mechanism 18 alternately the loose wheel of the gear set 15 for the $5^{th}$ gear or the gear set 16 for the $6^{th}$ gear can be connected in a torque transmitting manner with the input shaft. The synchronizing mechanism 19 for the reverse gear is provided on the first output shaft 4. For the reverse gear a further intermediate gear, that is not shown, is needed and meshed with the fixed gear on the input shaft 3 and the loose wheel on the output shaft 4 of the gear set 17. The output pinion 11 is fixed on the first output shaft 4 and meshes directly with the drive shaft 13.

The second gear section 2 comprises gear sets 20 through 23 for the $1^{st}$ to the $4^{th}$ gear. The shift mechanism 24 for shifting the $1^{st}$ and the $2^{nd}$ gear is provided on output shaft 9, i.e. the loose wheels of gear sets 20 and 21 are provided on the output shaft 9 while the related fixed wheels are attached to intermediate shaft 8. The synchronizing mechanism 25 for shifting the $3^{rd}$ and $4^{th}$ gears is provided on the intermediate shaft 8, i.e. the loose wheels of the $3^{rd}$ and $4^{th}$ gear are provided on the intermediate shaft 8 and the fixed wheels are provided on the output shaft 9.

Further it can be seen that the pairs of gears for the $1^{st}$ and $2^{nd}$ gear 20 and 21 and for the $3^{rd}$ and $4^{th}$ gear 20 and 23 are positioned behind and in front of the gear meshing with the intermediate gear 10 on the intermediate shaft 8 on the respective shafts. This split-up renders it possible to move the second gear section 2 in axial direction towards the clutch 5 and towards the driving motor that is not shown. Consequently, the overall length in axial direction of the second gear section is short in opposite direction from clutch 5 and defined by the 2 gear sets for the $1^{st}$ and $2^{nd}$ gears 20 and 21. Hence, the overall length of the entire transmission is mainly defined by the axial length of the first gear section 1.

In FIG. 4 the power shift variation of the transmission according to the present invention is shown. In principle, the design is the same as for the manual transmission shown in FIG. 3. The main difference is the additional input shaft 26 that is designed as a hollow shaft and provided in coaxial relation to the first input shaft 3. The clutch 5 is designed as a twin-clutch, allowing to connect the first input shaft 3 by means of clutch 5', and the second input shaft 26 by means of clutch 5'', separately with the motor shaft 6, respectively. In addition, the second input shaft 26 comprises a gear meshing with the intermediate gear 10 so that the second input shaft 26 is only connected to the second gear section 2. To the contrary, the first input shaft 3 is only connected to the first gear section 1.

Further, positioning of the gear sets is different in this power shift version. An embodiment is shown maintaining the synchronizing mechanisms (18, 19, 24, 25) as shown in FIG. 3, with only even-numbered gear sets for the $2^{nd}$, $4^{th}$, and $6^{th}$ gear 21, 23 and 16 in the first gear section 1, and with odd-numbered gear sets for the $1^{st}$, $5^{th}$ and $3^{rd}$ gear 20, 22 and 15 as well as for the reverse gear 17 in the second gear section 2.

Within the hollow first input shaft 3 a pump shaft 27 is provided, attached rigidly to the motor shaft 6, and comprises an output gear 28 driving the non-shown oil pump.

Both FIGS. 3 and 4 demonstrate that the transmission according to the present invention is not limited to the shown embodiments. Any combination of gear set positioning is possible, both in relation to the gear section 1 and 2 as in relation to the position within the gear sections and in relation to positioning the synchronizing mechanisms either on the input shafts, the output shafts or the intermediate shafts. Additionally, the transmission is not limited to a particular number of gears but any number of forward or reverse gears is possible. For all mentioned features it applies that the transmission according to the present invention can be provided in any desired technically possible combination.

The invention claimed is:

1. Short change gear, in particular for motor vehicles, comprising
   a first input shaft;
   a second input shaft
   a first output shaft;
   a second output shaft;
   a drive shaft that is in torque transmitting connection with the first and second output shafts;
   a first group of gear sets comprising at least one first gear set;
   a second group of gear sets comprising at least one second gear set and being radially offset with respect to the first group of gear sets;

an intermediate shaft;

a first gear section in which the first input shaft is connectable with the first output shaft by means of the first group of gear sets;

a second gear section in which the intermediate shaft is connectable to the second output shaft by means of the second group of gear sets;

wherein the intermediate shaft is in gearing connection with the second input shaft.

2. The short change gear of claim 1 further comprising:
a first drive pinion provided on the first output shaft;
a second drive pinion provided on the second output shaft;
wherein the intermediate shaft being in gearing connection with the second input shaft as well as the first and second drive pinions are positioned in one and the same plane.

3. The short change gear of claim 1 wherein the second gear section comprises the second group of gear sets, at least one of these gear sets being positioned in front and at least one of these gear sets being positioned behind the gearing connection of the intermediate shaft to the second input shaft when viewed in longitudinal directions of the intermediate shaft.

4. The short change gear of claim 1 wherein the number of second gear sets in the second gear section is at least as high as the number of first gear sets in the first gear section.

5. The short change gear of claim 1 further comprising:
loose wheels being part of the first and second gear sets; arid
mutual synchronizing mechanisms;
wherein the loose wheels of the gear sets in the gear sections are shifted by means of the mutual synchronizing mechanisms.

6. The short change gear of claim 1 further comprising:
a pump shaft connected to a motor shaft and provided coaxially and within the first input shaft that is designed as a hollow shaft.

7. The short change gear of claim 1 wherein the gearing connection between the intermediate shaft and the second shaft comprises gears on both intermediate shaft and input shaft and an intermediate gear.

8. Use of the change gear of claim 1 as a change gear installed in lengthwise orientation in a motor vehicle.

9. Use of the change gear of claim 1 as a change gear installed in transverse orientation in a motor vehicle.

10. The short change gear of claim 1 further comprising:
a first clutch;
a second clutch;
wherein a motor shaft is connectable by means of the first clutch with the first input shaft that is connectable with the first output shaft; and
wherein the motor shaft is connectable by means of the second clutch with the second input shalt that is positioned in coaxial relation to the first input shaft, and said second input shaft is connected to the intermediate shaft by means of the gearing connection.

11. The short change gear of claim 10 wherein the first gear section does not comprise any gear sets for even-numbered forward gears and the second gear section does not comprise any gear sets for odd-numbered forward gears.

12. The short change gear of claim 10 wherein the first gear section does not comprise any gear sets for odd-numbered forward gears and the second gear section does not comprise any gear sets for even-numbered forward gears.

13. The short change gear of claim 10 wherein the first gear section comprises the gear sets for the $2^{nd}$, $4^{th}$ and $6^{th}$ gear, and the second gear section comprises the gear sets for the $1^{st}$, $3^{rd}$ and $5^{th}$ gear.

14. The short change gear of claim 10 further comprising
a fixed wheel;
a loose wheel;
an intermediate wheel rotatably borne on a shaft;
wherein the second gear section comprises a gear set for a reverse gear in which the fixed wheel is connected to the loose wheel by means of the intermediate wheel.

15. Use of the change gear of claim 10 as a manual change gear for motor vehicles.

16. Use of the change gear of claim 10 as an automatic change gear for motor vehicles.

17. Use of the change gear of claim 10 as a power shift gear for motor vehicles.

* * * * *

UNITED STATES PATENT AND TRADEMARK OFFICE
CERTIFICATE OF CORRECTION

PATENT NO. : 7,114,409 B2
APPLICATION NO. : 10/790928
DATED : October 3, 2006
INVENTOR(S) : Ulrich Eggert and Andreas Hegerath It is certified that error appears in the above-identified patent and that said Letters Patent is hereby corrected as shown below:

| Column | Line | Error | Correct to Read |
|---|---|---|---|
| 1 | 10 | for use in a motor vehicle, and, more particularly, to a short | for use in a motor vehicle, and, more particularly, to short |
| 7 Claim 3 | 23 | when viewed in longitudinal directions of the intermediate | when viewed in either one of the two longitudinal directions of the intermediate |
| 7 Claim 5 | 29 | arid | and |
| 7 Claim 7 | 40 | shaft comprises gears on both intermediate shaft and input | input shaft comprises gears on both intermediate shaft and input |

Signed and Sealed this

Thirty-first Day of March, 2009

JOHN DOLL
*Acting Director of the United States Patent and Trademark Office*